BEAL & HALE.
Corn and Coh Crusher.
No. 4,895. 
Patented Dec. 17, 1846.
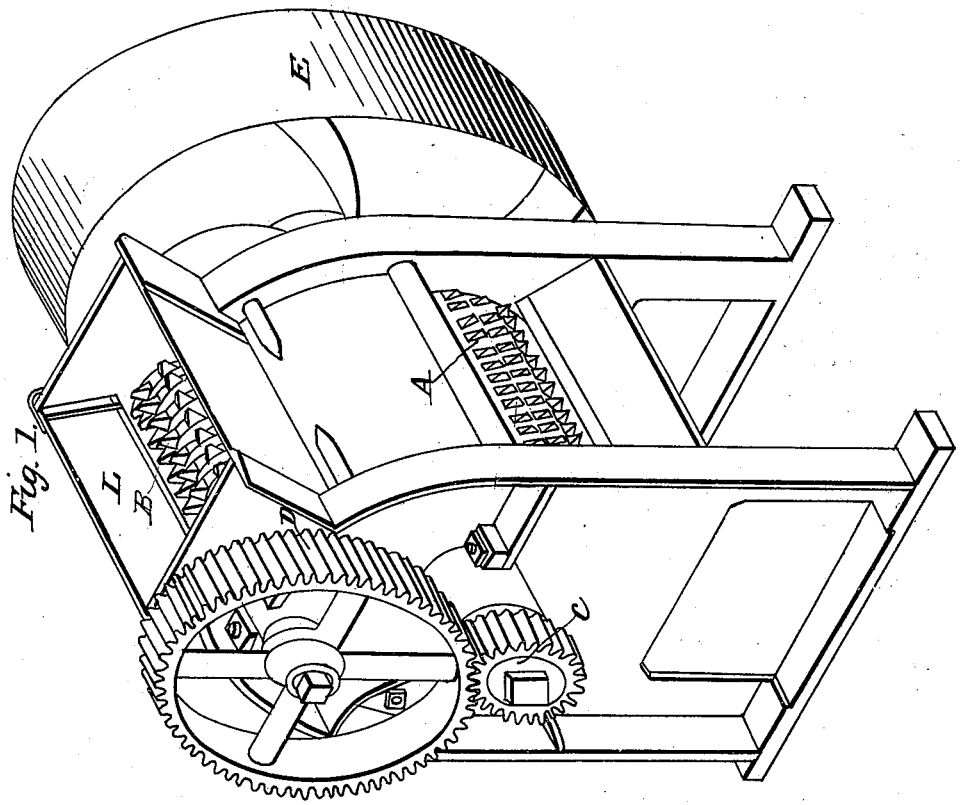
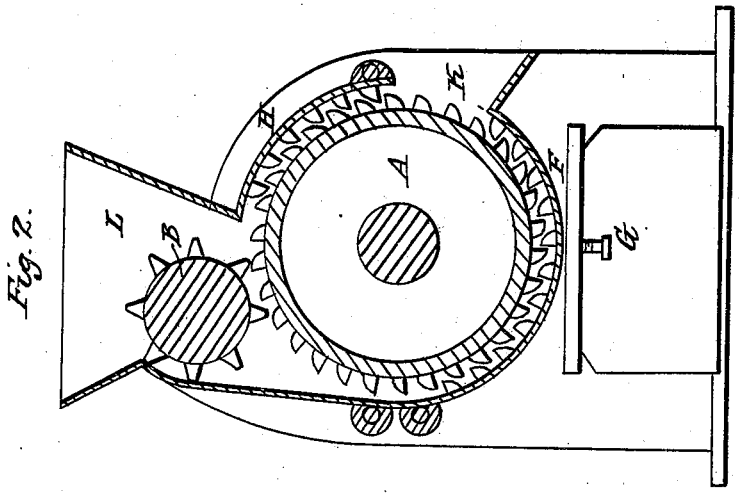

UNITED STATES PATENT OFFICE.

WM. BEAL, JR., OF NORWAY, MAINE, AND BERNICE S. HALE, OF LOWELL, MASSACHUSETTS.

MILL FOR CRACKING AND GRINDING.

Specification of Letters Patent No. 4,895, dated December 17, 1846.

*To all whom it may concern:*

Be it known that we, WILLIAM BEAL, Jr., of Norway, in the county of Oxford and State of Maine, and BERNICE S. HALE, of Lowell, in the county of Middlesex and Commonwealth of Massachusetts, have invented a new and Improved Machine for Cracking and Crushing Corn and Cobs Together and also for Grinding Bark, Apples, &c.; and we do hereby declare the following to be a full and exact description of the construction and operation of the same, reference being had to the accompanying drawings, making a part of this specification.

Figure 1, is a perspective view of our machine, and Fig. 2, is a vertical transverse section of the same.

We place in a suitable frame a main cylinder A, covered with projecting pointed teeth; over the cylinder A, we place a smaller cylinder B, also armed with teeth. The teeth in cylinder B, pass between the teeth in cylinder A. On the shaft of main cylinder A, is a pinion C, working into a cog wheel D, on the shaft of cylinder B. E, is a driving pulley on the shaft of the main cylinder. The main cylinder A, is about three times the diameter of the cylinder B; the pinion C, is also about one third the diameter of the cog wheel D; it will therefore be perceived that the speed of the periphery of the main cylinder A will be nine times greater than that of the cylinder B, and that the cylinders A and B, move in opposite directions. Underneath the main cylinder A, is placed a hinged adjustable concave F, adapted to the same with projecting teeth similar to those on the cylinder. The teeth in the concave F, pass in between the teeth of the cylinder A.

G, is a set screw for regulating the distance between the concave F, and the main cylinder A.

H, is a smaller concave embracing a section of the main cylinder A, just above the discharge aperture K. The concave H is armed with teeth which pass between the teeth on the main cylinder, and remove all adhering substances that may clog the same. The corn on the cob, or other substances to be crushed, is placed in the hopper L over the cylinders A and B, and is drawn in between them, the rapid motion of the teeth on the main cylinder, crushes and breaks the substance against the slower moving teeth on the cylinder B, the article then is carried between the concave F, and the main cylinder, and is again crushed and broken up still finer between the stationary teeth on the concave, and the teeth on the main cylinder; it is then discharged through the aperture K. The discharge aperture K, is between the concaves F and H.

Having thus fully described our invention, what we claim therein as new and desire to secure by Letters Patent is—

The combination of the main cylinder A, with the small cylinder B, (revolving in an opposite direction at a slower speed) the adjustable concave F, and the cleaning concave H, respectively armed with teeth, and operating substantially in the manner and for the purpose herein set forth.

WILLIAM BEAL, JR.
BERNICE S. HALE.

Witnesses:
Z. C. ROBBINS,
ORRAMEL H. THROOP.